United States Patent [19]
Chang

[11] 3,941,733
[45] Mar. 2, 1976

[54] SILANOL-CONTAINING URETHANE DISPERSIONS
[75] Inventor: Joe H-S Chang, St. Paul, Minn.
[73] Assignee: Minnesota Mining and Manufacturing Company, St. Paul, Minn.
[22] Filed: Jan. 2, 1975
[21] Appl. No.: 538,153

[52] U.S. Cl. 260/29.2 M; 260/29.2 TN; 260/46.5 P; 260/46.5 G; 260/77.5 R; 260/77.5 AM; 260/824 R; 428/304
[51] Int. Cl.² .................. C08J 3/10; C08L 75/00
[58] Field of Search....... 260/29.2 TN, 29.2 M, 824, 260/46.5 P, 46.5 G, 77.5 AM

[56] References Cited
UNITED STATES PATENTS

| | | | |
|---|---|---|---|
| 3,179,713 | 4/1965 | Brown | 260/33.6 |
| 3,622,527 | 11/1971 | Dieterich et al. | 260/29.2 TN |
| 3,627,722 | 12/1971 | Seiter | 260/77.5 A |
| 3,632,557 | 1/1972 | Brode et al. | 260/77.5 B |
| 3,640,924 | 2/1972 | Herman et al. | 260/29.2 TN |
| 3,803,069 | 4/1974 | McWilliams et al. | 260/29.2 TN |
| 3,814,716 | 6/1974 | Kowalski et al. | 260/29.6 T |

Primary Examiner—Murray Tillman
Assistant Examiner—J. Ziegler
Attorney, Agent, or Firm—Alexander, Sell, Steldt & DeLaHunt

[57] ABSTRACT

Dispersions of poly(urethane-urea) terminated by hydrolyzable or hydrolyzed silyl groups form self-supporting films and coatings on webs. Leather coated with one of these compositions has excellent wear-resistance.

5 Claims, No Drawings

SILANOL-CONTAINING URETHANE DISPERSIONS

This invention relates to aqueous dispersions of poly(urethane-urea) terminated by hydrolyzable or hydrolyzed silyl groups and containing solubilizing or emulsifying groups, particularly carboxyl groups. This invention further relates to films formed from said dispersions and to materials and surfaces such as leather, woven and nonwoven webs, glass, glass fibers, wood, aluminum, etc., coated with said dispersions or films formed therefrom.

It is well known to treat substrates such as leather with urethanes, generally polyurethanes. Polymers are generally applied either neat or from solvent solution as one-part or two-part systems. Frequently, isocyanate terminated polymers are used, so that the material can be "chemically bonded" to the leather.

The use of solvents creates problems of pollution, toxicity, flammability, cost, etc. The avoidance of solvents has had limited applicability because of the relatively high viscosity of the polymers and difficulty of control. Although the use of aqueous dispersions or latices has been described from time to time in the literature, the instability of most of the latices to the mechanical action required in applying the material to the substrate, and the generally unsatisfactory nature of the coating derived from the process has retarded commercialization.

The art most closely approaching the present invention is found in several United States Patents which overall emphasize polyurethane materials which are unstable to water and are generally kept from contact with water until after application to the surface, e.g., leather, being treated. Thus, U.S. Pat. No. 3,179,713 describes the treatment particularly of leather with polysiloxanes containing isocyanate radicals as terminal groups. These are employed in amounts of 10-75% by weight with triorganosilyl endblocked diorgano polysiloxanes. The resulting product has all the characteristics of a siloxane-treated leather, except that the reactive isocyanate groups are stated to provide better bonding. Such compositions must be applied from solvent and must be protected from exposure to moisture prior to application to the leather. The compositions are applied at 15% to 25% by weight of the leather.

A class of silyl group-containing polymers which is cured by moisture is described by Brode et al., U.S. Pat. No. 3,632,557. The polymers are described as "vulcanizable" and are formed as films and plaques which cure by exposure to atmospheric moisture. This curing by moisture appears to be what is meant by vulcanizing in this instance. Because of this sensitivity, patentee taught that care had to be exerted at all times to avoid premature exposure to moisture. A polyurethane sealant containing alkoxysilyl terminating groups and which cures by moisture is described by Seiter, U.S. Pat. No. 3,627,722.

Latex polymers which are vinyl addition polymers formed by free radical polymerization and comprise vinyl hydrolyzable silane, an ester of the group of acrylic, maleic and fumaric esters and/or vinyl acetate are described by Kowalski et al. in U.S. Pat. No. 3,814,716. These are dispersed in water using anionic or nonionic surfactants and are said to be useful to give durable coatings on various substrates which are generally rigid.

It would be desirable to have the advantages of silicon-containing groups, particularly curability, in a polyurethane composition which is not sensitive to water. Accordingly, it is an aim and object of this invention to provide a curable composition containing polyurethane and silyl groups which is not sensitive to moisture before application and reduce the use of expensive and polluting solvents for application. A further object is to provide silyl group-containing polyurethanes which are film-forming. A yet further object of the invention is to produce polyurethane latices which are stable to shear as to be mechanically pumpable. Other objects will become evident hereinelsewhere.

In accordance with the above and other objects of the invention, it has now been found that -$SiY_3$ group-containing poly(urethane-urea)s in aqueous dispersion are useful as film-forming and coating materials. The term poly(urethane-urea), or sometimes polyurethane-polyurea, refers to a polymeric material, the backbone of which comprises a multiplicity of urethane linkages,

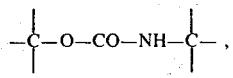

and may also contain one or more urea linkages:

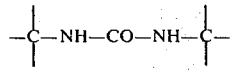

Aqueous poly(urethane-urea)s dispersions of the invention are found to be stable to shear, to have enhanced chemical and mechanical stability, to have relatively low viscosities even at high polymer concentrations. They present reduced hazards and costs as compared to polyurethane solutions of the art because of their lower contents of solvents. Because they are aqueous, there are no problems associated with continuous maintenance of anhydrous conditions prior to use. Films formed from these dispersions are free from the problems associated with the presence of surfactants which are encountered with films formed from conventional externally emulsified dispersions.

A particularly convenient method of preparing -$SiY_3$ group-containing poly(urethane-urea)s in aqueous dispersion or latex form is by dispersion of suitable intermediate reaction mixtures containing intermediate isocyanate compounds in which ultimately terminal $Y_3Si$-(or -$SiY_3$) groups are attached to a small predetermined fraction of isocyanate groups by using suitable $X_3Si$-silanes, where $X_3Si$- is a functional silyl group including three hydrolyzable substituents X, such as H, alkoxy, acyloxy, halogen, amino and the like, wherein preferably the hydrolyzable substituents are alkoxy or acyloxy and the functional silyl group is $X_3'Si$-. Y is a labile group, one of the hydrolyzable groups of X or it can be the non-hydrolyzable OH. Preferably the labile group is Y' in the group $Y_3'Si$- where Y' is acyloxy or —OQ where Q is hydrogen or lower alkyl of 1 to 4 carbon atoms.

Another predetermined small fraction of the isocyanate groups is reacted with compound, herein termed a water-solubilizing compound, although dispersed polymers are generally not water soluble, containing, in addition to the solubilizing group, two isocyanate-reactive hydrogen atoms to provide internal emulsifying groups and thus to provide self-emulsifying characteristics to the polymer. Suitable solubilizing groups are those which ionize in water, such as carboxyl, sulfate, sulfonate, phosphonate, ammonium, including quaternary ammonium, and the like. Preferred isocyanate-reactive hydrogen atoms are those which react readily with an isocyanate group at or below about 75° C. such as the hydrogen atoms of aliphatic hydroxyl, aliphatic mercapto, and aliphatic or aromatic amino groups. Hydrogen atoms which react slowly, such as the "acidic" hydrogen atoms in amido groups, and those which form thermolabile isocyanate adducts, such as aromatic hydroxyl hydrogen atoms, are not included.

Either before or after reaction with $X_3Si$- silane and with or without water-soluble compound, part or all remaining isocyanate groups are reacted with one or more compounds containing more than one isocyanate-reactive group. In a preferred process, reaction with a polyoxyalkylene glycol is effected with a large fraction of the isocyanate groups before reaction with $X_3Si$- silane and water-soluble compound and subsequently the resulting prepolymer mixture is reacted with water to form multiplicities of chain-extending urea linkages. At least a portion of the hydrolyzable X groups are likely to be hydrolyzed during emulsification to -OH groups. The preferred compositions of the invention are thus seen to be $Y_3Si$- terminated poly(urethane-urea)s and aqueous dispersions thereof.

The inclusion of diol acids in polyurethane compositions has been described by Herman et al. in U.S. Pat. No. 3,640,924. The intermediates are emulsified in the presence of tertiary amine and thickeners are added to give curable adhesives.

A preferred procedure for preparing compositions of this invention comprises (1) reacting polymeric polyol with a stoichiometric excess of polyisocyanate to prepare isocyanate-terminated prepolymer, (2) reacting the prepolymer with less than stoichiometric amounts of isocyanate-reactive $X_3Si$-compound and water-solubilizing compound, (3) finally mixing the resluting isocyanate-containing prepolymer with water, under agitation, to produce a stable dispersion of silanol-terminated, i.e., $Y_3Si$-terminated, poly(urethane-urea). Alternative procedures involve simultaneous or sequential reaction of at least two fold stoichiometric excess of diisocyanate with isocyanate-reactive $X_3Si$-compound and isocyanate-reactive ionic water-solubilizing compound. Separately reacted materials may then be combined or the $X_3Si$-containing material is used alone and either of these or the isocyanate-terminated material prepared by sequential reactions is then reacted with more or less than stoichiometric amount of diol and the resulting reaction mixture emulsified in water. Preferably, reaction is with not more than the stoichiometric amount so that the emulsified polymer will have $Y_3Si$-groups at each end. The backbone chain will contain more or less urea linkages after emulsification depending on the number of isocyanate groups entering into reaction with water.

The isocyanate-terminated polyurethane prepolymers useful in the present invention are prepared by reacting a molar excess of organic polyisocyanate with one or more polyols, as is well known in the art. A summary of urethane polymer chemistry and technology can be found, for example, in Polyurethanes: Chemistry and Technology, Saunders and Frisch, Interscience Publishers (New York, 1963 (Part I) and 1964 (Part II)).

The poly(urethane-urea)s of the dispersions of the invention are composed of several moieties. Urethane and urea moieties link together polyvalent, generally divalent, isocyanate-derived moieties, diol-derived moieties and solubilizing moieties in the chain and monovalent terminal silyl moieties. Isocyanate-derived moieties and diol-derived moieties are the radicals derived from polyisocyanates and diols respectively by elimination of isocyanate and isocyanate-reactive groups respectively. Water-solubilizing ionic compounds and silyl compounds yield solubilizing moieties and silyl moieties by elimination of isocyanate-reactive groups. Each moiety is of from 25 to 5000 daltons in size. The molecule as a whole is thus made up of recurring isocyanate-derived moieties and diol-derived moieties together with interspersed solubilizing moieties separated by urethane and urea moieties. The molecules as a whole are generally terminated by silyl moieties. To some extent, of course, two or more molecules in aqueous dispersion may be connected by siloxane linkages.

Any suitable organic polyisocyanate, either aliphatic, cycloaliphatic, araliphatic or aromatic, may be used either singly or in mixtures of two or more. Either aromatic or aliphatic isocyanates are suitable, the aliphatic isocyanates generally giving softer polymers and coatings having better light stability than the aromatic compounds. The aromatic compounds are more economical and generally useful. Isocyanates containing more than two isocyanate groups in the molecule can be included without measurable changes in the characteristics of the resulting polymer; diisocyanates are preferred. Suitable organic polyisocyanates include m-phenylene diisocyanate, p-phenylene diisocyanate, 2,4-tolylene diisocyanate, 2,6-tolylene diisocyanate, 4,4'-diphenylmethane diisocyanate, benzidine diisocyanate, naphthalene-1,5-diisocyanate, hexamethylene diisocyanate, and other alkylene diisocyanates, 4,4',4''-triphenylmethane triisocyanate, decamethylene diisocyanate, polyphenylmethylene polyisocyanates that are produced by phosgenation of aniline/formaldehyde condensation products containing up to about four aromatic rings, dianisidine diisocyanate, xylylene diisocyanate, bis(2-isocyanatoethyl)fumarate, bis(2-isocyanatoethyl) cyclohex-4-ene-1,2-dicarboxylate, bis(2-isocyanatoethyl) carbonate and many other organic polyisocyanates known in the art. The isocyanate-derived moiety is thus a polyvalent organic radical of from about 2 to about 30 carbon atoms free from isocyanate-reactive or hydroxyl-reactive groups, e.g., OH, SH, $CO_2H$, COCl, $SO_3H$, $SO_2Cl$, etc.

In producing the isocyanate-terminated polyurethane prepolymers of the present invention, one or more polyhydroxy compounds or polyols can be employed in the reaction with the organic polyisocyanate.

Illustrative polyhydroxy compounds include the following classes of compounds:
a. lactone polyols and the alkylene oxide adducts thereof:
b. the polyester polyols, and the alkylene oxide adducts thereof:
c. the polyoxyalkylene polyols and polyoxycycloalkylene polyols and the alkylene oxide adducts thereof;
d. the polytetramethylene glycols.

The term "diol" is intended to include mixtures of diols as well as mixtures containing amounts of triols or tetrols sufficient to provide a low level of cross-linking without excessively affecting the properties of the final product. An amount of cross linking not exceeding about 1 cross link per 3000 daltons is considered suitable.

The term "alkylene oxide" includes, for example, ethylene oxide, 1,2-epoxypropane, 1,2-epoxybutane, 2,3-epoxybutane, isobutylene oxide, epichlorohydrin, and the like and mixtures thereof.

Lactone polyols are prepared by reacting a lactone such as epsilon-caprolactone or a mixture of epsilon-caprolactone and an alkylene oxide with a polyfunctional initiator such as polyhydric alcohol. The term "lactone polyols" also includes the various "copolymers" such as lactone copolyesters, lactone polyester/polycarbonates. Lactone polyester/polyethers, lactone polyester/polyether/polycarbonates, and the like.

Polyester polyols are esterification products which range from liquids to non-crosslinked solids, i.e., solids which are soluble in many of the more common inert normally liquid organic media, and which are prepared by the reaction of polycarboxylic acids, their anhydrides, their esters or their halides, with a stoichiometric excess of a polyol. Illustrative of the polycarboxylic acids which can be employed to prepare the polyester polyols preferably include dicarboxylic acids and tricarboxylic acids, such as maleic acid, succinic acid, glutaric acid, adipic acid, pimelic acid, suberic acid, azelaic acid, sebacic acid, chlorendic acid, 1,2,4-butane-tricarboxylic acid, phthalic acid, and the like, while the esterification reaction is well known in the art.

Polyoxyalkylene polyols include alkylene oxide adducts of, for example, water, ethylene glycol, diethylene glycol, propylene glycol, dipropylene glycol, glycerol, 1,2,6-hexanetriol, 1,1,1-trimethylol ethane or propane, pentaerythritol, and the like. The alkylene oxides employed in producing polyoxyalkylene polyols normally have from 2 to 4 carbon atoms. Ethylene oxide, propylene oxide and mixtures of propylene oxide with ethylene oxide are preferred. Such polyalkylene polyols are well known in the art.

Another useful class of polyols is the polyoxytetramethylene glycols, which are prepared by polymerizing tetrahydrofuran in the presence of acidic catalyst. Preferred diols are the polyester diols and polyoxyalkylene diols.

As indicated above, triols, tetrols, triisocyanates, etc., can be used in making the polyurethanes used in the invention. Small amounts of cross-linking in the polyurethane-polyurea backbone of the polymer improve tensile strength and decrease cold-flow. On the other hand, excessive amounts cause poor flow and thus less desirable film formation. Preferably, there should not be more than 1 crosslink from polyol or polyisocyanate for each 3000 daltons. The unit "dalton" is defined as one-twelfth the mass of a neutral carbon-12 atom (or one-sixteenth the mass of an oxygen-16 atom) and is also called the atomic mass unit (international). It is conveniently used in discussions of large molecules and is herein abbreviated as a captial letter D.

The molecular weight of the diol component is one significant factor in determining the final properties of the polymer; generally, the higher the molecular weight, the softer the resulting polymer. The term "molecular weight" is used herein to refer to the number average molecular weight ($\bar{M}_n$). Diols of molecular weight as low as 200 and as high as 5000 produce suitable products, molecular weight ranges of 300–3000 being preferred and most readily commercially available. Diols of lower molecular weight can be used for chain extension. The diol-derived moiety is thus a polyvalent organic radical of from about 2 to about 275 carbon atoms free from isocyanate-reactive or hydroxyl reactive groups.

It is important that the prepolymer prepared be isocyanate-terminated, i.e., that more than one isocyanate radical be present in the reaction mixture for each hydroxyl radical in the included diol. Isocyanate to hydroxyl ratios of 1.05 to 5 are suitable. Ratios of less than 1.5 tend to produce polymers which are softer than desirable, show lower adhesion to substrates and form weaker films. Ratios higher than about 4 provide a high polyurea content in the molecule when the material is emulsified in a subsequent step, and the final products tend to be hard and stiff. Diols having higher equivalent weights can be employed in higher weight ratios of isocyanate to hydroxyl. Although useful polymeric dispersions are obtained over a wide range of urea/urethane linkages ratio, including polymer with no significant urea content, preferred polymers comprise both urea and urethane linkages in a urea/urethane ratio of 0.25 to 2.

Silyl-terminated prepolymers formed by reacting isocyanate-terminated prepolymer with a minor amount of isocyanate-reactive solubilizing compound, and silyl compound, then chain-extended with at least a stoichiometric amount of a diol, e.g., ethylene glycol or 1,6-hexandiol, neat or in the presence of an aprotic solvent to control viscosity, can readily be dispersed in water to provide stable film-forming dispersions. Such dispersions are well suited impregnants for leather or paper, which surfaces preferably will subsequently be coated with a silyl-terminated polyurethane polyurea latex topcoat.

Silane compounds containing three hydrolyzable groups on the silicon (as $X_3Si$-) and one organic group including an isocyanate-reactive radical are most suitable for forming the terminal groups. As has been pointed out above, any of the conventional hydrolyzable groups, such as hydrogen, alkoxy, acyloxy, halogen, amino, and the like, designated "X" can be used. These and the product of their hydrolysis, i.e., hydroxy, are designated as "Y" groups. The hydrogen halide liberated from halogen-containing silanes may be disadvantageous when cellulose substrates are used and amino containing silazines are relatively unstable and difficult to handle. The alkoxy group is the most preferred hydrolyzable group and particularly preferred compounds are thus of the structure $(RO)_3SiR'Z$ wherein $(RO)_3SiR'$- is a silyl moiety, R is lower alkyl radical of one to four carbon atoms, preferably one or two, i.e., methoxy, ethoxy, lower acyl of 2 to 5 carbon atoms, preferably 2 or 3, i.e., acetyl or propionyl, R' is a divalent organic bridging radical of 2 to 20, and preferably 3–10 carbon atoms selected from the group consisting of a divalent hydrocarbyl radical free from olefinic unsaturation and free from isocyanate-reactive groups, a divalent polyoxyalkylene mono- or polyoxaalkylene radical containing not more than one ether oxa oxygen per two carbon atoms, and a divalent hydrocarbylamino radical, Z is an isocyanate reactive group such as —OH, —SH, —NHR, —NH$_2$, and —N(C$_2$H$_4$OH)$_2$. Representative divalent alkylene radicals include —CH$_2$CH$_2$—, —CH$_2$CH$_2$CH$_2$—, —CH$_2$CH$_2$CH$_2$OCH$_2$CH$_2$—, —CH$_2$CH$_2$CH$_2$NHCH$_2$CH$_2$—, —CH$_2$CH$_2$C$_6$H$_4$CH$_2$CH$_2$—. Such silicon compounds are well known in the art and many are commercially available or are readily prepared. Sufficient silane must be present to provide the desired level of water resistance and film properties. In general, these levels are attained with polymers containing, on the average, no more than two silicon atoms (or terminal silyl groups) per 1000 daltons and no less than two silicon atoms per 125,000 daltons. The preferred range is two silicon atoms (or silyl groups) per 1500 to 100,000 daltons.

The terminal silyl groups make the polymers curable by mutual interreaction to form siloxane linkages, e.g.,

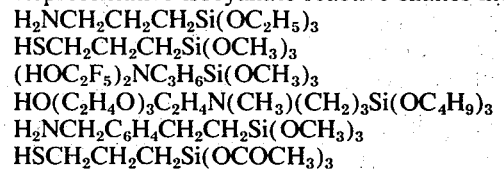

Representative isocyanate-reactive silanes include:
H$_2$NCH$_2$CH$_2$CH$_2$Si(OC$_2$H$_5$)$_3$
HSCH$_2$CH$_2$CH$_2$Si(OCH$_3$)$_3$
(HOC$_2$F$_5$)$_2$NC$_3$H$_6$Si(OCH$_3$)$_3$
HO(C$_2$H$_4$O)$_3$C$_2$H$_4$N(CH$_3$)(CH$_2$)$_3$Si(OC$_4$H$_9$)$_3$
H$_2$NCH$_2$C$_6$H$_4$CH$_2$CH$_2$Si(OCH$_3$)$_3$
HSCH$_2$CH$_2$CH$_2$Si(OCOCH$_3$)$_3$ Solubilizing compounds contain two groups containing isocyanate-reactive hydrogen which are connected through an organic radical to each other and to a water-solubilizing ionic group. A suitable composition is represented by the formula (HB)$_2$R''A in which R''A is a solubilizing moiety; B represents O, S, NH, NR; R'' represents a trivalent organic linking group having 2–25 carbon atoms which may include tertiary nitrogen or ether oxygen atoms and is free from isocyanate-reactive hydrogen containing groups and preferably free from olefinic unsaturation; A is a water solubilizing ionic group such as —SO$_3$M, —OSO$_3$M, —CO$_2$M, —PO(OM)$_2$, —NR$_2$·HX, -NR$_3$X, where M is H or one equivalent of a mono- or divalent soluble cation such as sodium, potassium, calcium, NR$_3$H+, and R is lower alkyl of 1-4 carbon atoms. The group —NR$_3$X represents a quaternary ammonium substituent which is a salt of water soluble acid, e.g., trimethyl ammonium chloride, pyridinium sulfate, etc. or ammonium substituent and the group —NR$_2$·HX which is salt of a water soluble acid, such as dimethyl ammonium acetate or propionate. A representative suitable solubilizing molecule would be alpha, alpha bis(hydroxymethyl) propionic acid ammonium salt. The water soluble thermolabile salts of volatile cations such as ammonium carboxylates are preferred because, when heated, they can decompose to provide acidic and basic components which can accelerate the rate of cure of the silanol-terminated polyurethane coatings. The amount of solubilizing group provided should be sufficient to self-emulsify the material. That is, there should be about one solubilizing group in the polymer for each 800 to 20,000 daltons or for each two silyl groups. At the higher concentrations of solubilizing groups, i.e., one or more per 1000 dalton, polymers tend to be more water-sensitive and may even be water-soluble prior to curing. Polymers in which there is an average of one or less solubilizing groups per 20,000 daltons tend to be difficult to emulsify.

Illustrative solubilizing compounds include:

H$_2$N—C$_2$H$_4$—NH—C$_2$H$_4$—SO$_3$H

HOCH$_2$—CHOH—CO$_2$Na

[(HOCH$_2$)$_2$CHCH$_2$—COO]$^-$[NH(CH$_3$)$_3$]$^+$

CH$_3$(CH$_2$)$_7$CHOH—CHOH(CH$_2$)$_5$CO$_2$K (HOC$_2$H$_4$)N—C$_3$H$_6$—OSO$_3$Na

[H$_2$N—C$_2$H$_4$—NH—C$_2$H$_4$—N(CH$_3$)$_3$]$^+$Cl$^-$

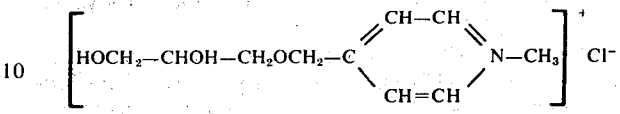

(HOCH$_2$CH$_2$)$_2$NC$_6$H$_4$O(CH$_2$CH$_2$O)SO$_2$OH
[(H$_2$N)$_2$C$_6$H$_3$SO$_3$]$^-$[NH(C$_2$H$_5$)$_3$]$^+$

As indicated hereinabove, the chain-extended silyl-terminated poly(urethane-urea) polymers cure by hydrolysis of the silyl group and formation of siloxane linkages. This reaction begins as soon as the polymer is exposed to water, but generally proceeds slowly at room temperature and within a pH range of about 6.5 to 9. The reaction proceeds more rapidly after drying and is markedly accelerated in the presence of acidic or basic catalysts. Although cures can be attained at room temperature or slightly above, it is generally preferred to cure articles coated with, or films deposited from, dispersions of the invention at temperatures of 75° to 200°C for times of about 5 to 60 seconds, the higher temperatures requiring shorter times. Curing results from the formation of siloxane cross-links. These cross-links are distinguished from cross-links formed in low concentration from the use of triols, triisocyanates, tetrols, and other highly functional reactants in preparing the prepolymer. The latter cross-links are herein sometimes referred to as prepolymer-derived cross-links and are to be understood as the type of cross-links present before curing.

The invention is now further illustrated by examples.

EXAMPLE 1

Into a 2-liter round-bottom glass flask equipped for heating, cooling, agitation and vacuum stripping are charged 1,350 parts (2.75 equivalents) of polyoxypropylene diol (average equivalent wt. 490), 34 parts (0.25 equivalent) of polyoxypropylene triol (average equivalent wt. 137). The solution is heated under reduced pressure of 2 torr at 130°–140° C. with stirring for 30 minutes, to dry the system. The solution is then cooled to 40° C. and 471 parts (5.4 equivalents) of toluene diisocyanate (80:20 percent mixture of 2,4 and 2,6) are added. The solution temperature increases to 65°–70° C. and is maintained in that range for 2 hours. To the reaction mixture is added 0.3 grams of a 25% solution of stannous octoate in dioctyl phthalate and stirring is continued, temperature being maintained at 65°–70° C. for an additional 3 hours. The solution is cooled to 60°–65° C. and diluted with 200 grams of methyl ethyl ketone to decrease the viscosity. The resulting solution comprises about 90% by weight of intermediate prepolymer containing 1 prepolymer-derived cross-link per 23,000 daltons for reaction herebelow.

A solution of isocyanate-reactive water-soluble salt is prepared by dissolving 170 parts of the triethylamine salt of α,α-bis(hydroxymethyl) propionic acid in 50 parts of methyl ethyl ketone.

To 275 parts of the vigorously stirred intermediate prepolymer solution in a 1 liter glass flask under a dry nitrogen blanket are added 5 parts of an isocyanate-reactive trialkoxysilane, triethoxysilylpropyl amine, $H_2N(CH_2)_3Si(OC_2H_5)_3$ (0.025 equivalent NH) followed by 25 parts of the above triethylamine salt solution containing 0.08 mols of carboxylic acid. Stirring is continued for 2 minutes. The reaction mixture comprises about 270 parts of linear polyurethane prepolymers all or most molecules of which contain terminal isocyanate groups; some contain terminal trialkoxy silyl groups and some contain pendent solubilizing ionic groups. The reaction mixture is dispersed in 500 g. water in the range of 20°–65° C. by a high-shear mechanical homogenizer (Gifford Homomixer at 80–90 reading for 15 seconds) to form a stable latex (designated A) containing emulsified silyl-terminated poly(urethane-urea) averaging about one carboxyl group per 3,300 daltons, about 1 prepolymer-derived crosslink per 8000 daltons and 23,000 daltons per pair of silyl groups. A second latex (designated B) is prepared as above, except that the trialkoxy silane is omitted, that is, it contains no terminal hydrolyzable silyl groups.

Both latices are allowed to stand at room temperature for 24 hours, filtered through cheesecloth and evaluated. Each latex is applied as a 0.0075 mm. (wet) coating to glass plates and dried for 15–20 minutes at 95° C. Water droplets placed on film from latex A, the silanol-terminated polyurethane, produced no detectable change at room temperature; water droplets on the surface of film from the second latex quickly caused white spots and loss of integrity of the film, indicating penetration through the film and displacement of the film from the substrate.

EXAMPLE II

A series of latices is prepared to determine the effect of varying silane content. Latices are prepared in accordance with Example I except that the polyol is a polyoxypropylene diol having a hydroxyl equivalent weight of 384 ($\bar{M}_n = 768$).

A prepolymer is prepared as a 91% solution in methyl ethyl ketone from 1536 parts (4.0 equivalents) of diol and 696 parts (8.0 equivalents) of 2,4-toluene diisocyanate. To 220 parts of the solution (200 parts by weight of prepolymer) are added the respective amounts of 3-triethoxysilylpropyl amine as indicated in Table I for products, C, D and E. After 30 minutes agitation at 30° C., 22 parts of the salt solution of Example I (17 parts salt) is added for each run and the solution is further stirred rapidly at 30° C. for 10 minutes. Each mixture is then dispersed in water to form a stable latex, designated C, D and F.

Table I

|  | C | D | E |
| --- | --- | --- | --- |
| g. Silane | 30 | 20 | 1 |
| D/ionic group[a] | 3000 | 3000 | 3000 |
| D/Si×2[b] | 3200 | 4800 | 96000 |
| Water, g. | 500 | 500 | 400 |
| pH | 8.5 | 8.3 | 7.5 |
| Coagulation | High | Moderate | None |
| Water Resistance | Excellent | Excellent | Fair |

[a] Daltons per water-solubilizing group, neglecting minor weight changes on emulsification.
[b] Two times the daltons per silicon atom, neglecting minor weight changes on emulsification.

All three form stable low viscosity latices with fine particle size that produce clear, acetone-resistant films. Latex C produces a large amount of precoagulum, a gummy mass that is readily separated from the remaining latex. The yield of latex solids is poor, but the resulting film is highly water-resistant. Latex D shows very little precoagulum, the yield of latex solids is good and the resulting film is highly water resistant. Latex E shows no precoagulum, giving excellent yield and producing a film with fair water resistance, although inferior to films from C and D.

When a water-soluble cationic, anionic or nonionic surfactant free of isocyanate-reactive groups is added to the silane-containing prepolymer above in place of the reactive salt, agitation of the resulting mixture with water results in an undesirable amount of precoagulum and films formed from the resulting latex are useful but inferior to those from a "self-emulsified" latex. Similarly, addition of the silane-containing prepolymer to an aqueous surfactant solution results in poor yield of latex which forms film inferior in water resistance to C, D or E.

EXAMPLE III

Two cationic latices are formed from the prepolymer of Example II with methyl diethanolamine acetate as the isocyanate-reactive water solubilizing salt.

|  | F | G |
| --- | --- | --- |
| Prepolymer (as 91% solution) | 200 | 200 |
| Methyl ethyl ketone |  | 15 |
| Methyl diethanolamine | 4 | 8 |
| $H_2N(CH_2)_3Si(OC_2H_5)_3$ | 4 | 4 |
| $CH_3CO_2H$ | 12 | 12 |
| Water | 500 | 400 |

Latex F is made by adding the methyl diethanolamine slowly to the prepolymer, with agitation, at 70° C. After one hour, the silane is added and mixing continued for 10 minutes. The mixture is cooled to 35° c. and dispersed in the solution of acetic acid and water to form a stable latex, but with extensive precoagulum. Latex G is prepared by first mixing the silane into the prepolymer for 30 minutes at 30° C., then adding to the mix a solution of methyl diethanolamine and acetic acid in methyl ethyl ketone, mixing for 10 minutes, and then dispersing the mixture in water. A stable latex with negligible precoagulum is formed. Latex F polymer has an average prepolymer weight of 6200 daltons per ionic group and an average of 23,000 daltons per pair of silyl terminal groups. Latex G had an average of 3000 daltons per ionic group and 23,000 daltons per silane pair.

Both latices are of low viscosity and have a relatively large particle size. They form tough films showing excellent water resistance and good acetone resistance. The latices improve the tensile strength, bursting strength and water resistance of paper when added at about 1% by weight of latex solids on pulp weight to the beater of a paper forming system.

EXAMPLE IV

The effect of polyol molecular weight is shown in runs H, I and J. The polyol is a polyoxypropylene diol of number average molecular weight ($\bar{M}_n$) as indicated, the isocyanate is 80:20 2,4- to 2,6-toluene diisocyanate in an equivalence ratio to diol as indicated, the reactive soluble salt and the alkoxy silane are those used in Example II, and the procedure is essentially that of Example II.

Table II

|  | H | I | J |
|---|---|---|---|
| Polyol $\overline{M}_n$ | 4,000 | 4,000 | 400 |
| Isocyanate/polyol ratio | 2 | 3 | 2 |
| D/ionic group | 12,000 | 5,900 | 6,100 |
| D/2 Si | 21,000 | 23,000 | 23,000 |
| Latex yield, % | 40 | 50 | 90 |

The films formed from H and I are soft and tacky, suitable for, for example, a laminating layer bonding two sheets of glass or plastic to glass. Coatings from J are tack free, insensitive to water and acetone and provide excellent impregnants to improve the dimensional stability of non-woven webs.

EXAMPLE V

In accordance with the procedure of Example II, an aqueous polymer dispersion (designated K) is prepared from:

| polyoxypropylene diol, $\overline{M}_n$ = 700 | 875 |
| polyoxypropylene triol $\overline{M}_n$ = 410 | 68.5 |
| 80:20 2,4:2,6-tolylene diisocyanate | 522 |
| $H_2N(CH_2)_3Si(OC_2H_5)_3$ | 29.3 |
| $CH_3C(CH_2OH)_2CO_2H·N(C_2H_5)_3$ | 73.3 |
| Water | 3000 |

The resulting dispersed polymer contains an average of 2800 daltons per carboxy salt solubilizing group, 23,000 daltons per two silyl end groups, and 9200 daltons per cross-link. A film is cast from 25 ml. of the dispersion placed in a 150 mm. diameter polypropylene petri dish, dried and cured in a 105° C. oven. The clear film is found to have the following properties:

| Tensile strength | 320 kg/cm$^2$ |
| Tensile Modulus, 100% | 87 kg/cm$^2$ |
| Tear strength | 45 kg/cm |
| Elongation at break | 420 % |

The film is found to show unexpected resistance to yellowing in aging.

The high tensile strength, elongation and resistance to water and abrasion of films made from this polymer makes formulations containing dispersion of this polymer suitable as top coats or over-print varnish for decorative print sheets or label stock. Clay-coated print sheet stock is coated with the above dispersion by pouring a small amount on the sheet, spreading with a wire-wrapped rod for coating paper (No. 6 Mayer rod), and drying for 20 seconds at 150° C., providing a clear, colorless, scuff-resistant, water resistant coated paper.

Heavier paper or fabric stock, such as is used for wall paper or decorative laminates, can be coated with dispersions of the invention and, after drying and curing, it can then be deeply embossed to provide a stain-resistant washable surface.

Heavy paper stock, e.g. decorative print sheet, is sprayed with the above dispersion to deposit 0.001 g/cm$^2$, then the polymer is embossed, again sprayed to deposit 0.001 g/cm$^2$ and cured. It shows an abrasion loss one-third that of a commercially available embossed paper.

Two separate samples of clay-coated paper board are coated at a level of 0.0005 g/cm$^2$ of polymer solids with (1) a commercial acid catalyzed melamine-formaldehyde-cured alkyd resin and (2) the above polymer dispersion latex K. A Taber Abraser is used to evaluate the two samples in substantial accordance with A.S.T.M. D1175-71. It is run for one hundred revolutions at 500 g. load using CS-17 Calibrase abrasive wheel.

|  | Original Weight grams | Weight Loss grams |
|---|---|---|
| Commercial Resin | 3.14 | 0.031 |
| Latex K | 3.15 | 0.020 |

The dispersion is particularly suitable for formulation as a top coat for finishing garment and shoe leather, to which the formulation can be applied by any of the conventional wipe, brush, spray, roll or dip methods, followed by drying and curing at 65 to 100° C. for 30 seconds to 2 minutes, the higher temperatures allowing the use of shorter times.

Abrasion resistance of cotton duck (weighing about 0.02 grams/cm$^2$) is compared on untreated fabric and fabric treated by padding with diluted dispersions A and K. These are diluted with water to 10% polymer solids and applied at the rate of 0.003 grams polymer solids per square centimeter of dry fabric, dried, and cured for 3 minutes at 120° C. Loss in weight is determined after 1,000 cycles on a Taber Abraser, using H-22 Calibrade abrasive wheel at a 1,000 gram loading, in substantial accordance with test method A.S.T.M. D1175-71; rotary platform double head method.

| Dispersion | Weight of Original Sample (g.) | Weight Loss (g.) |
|---|---|---|
| None | 4.69 | 0.25 |
| A | 5.05 | 0.09 |
| K | 5.06 | 0.08 |

Tensile strength tests are carried out on a felt material of 0.20 grams/cm$^2$ weight. The felt is padded in a dispersion of 10% by weight polymer solids of latices A and K, squeezed to 120–150% wet pick-up, dried and cured for 3 minutes at 120° C. Samples for testing are stamped in standard tensile dumb-bell shapes, cut for measurement parallel to machine direction (MD) and perpendicular to machine direction (CD) of the felt and tested.

| Dispersion | Polymer Solids Wt. % | Tensile Strength, kg/cm$^2$ MD | CD |
|---|---|---|---|
| Untreated | 0 | 12.6 | 10.5 |
| A | 13.5 | 43.5 | 25.4 |
| K | 19.0 | 68.0 | 38.0 |

Nonwoven fabrics for dusting and polishing treated with the dispersion or formulations thereof can be used on polished surfaces without leaving the characteristic haze found when similar "wipes" are prepared from conventional dispersions made with an external emulsifier. This further demonstrates the advantages of bound ionic groups pendent from the backbone of the poly(urethane-urea) characteristic of the self-emulsifying prepolymers of the invention.

The dispersion can be used to coat reusable glass bottles, the tough adherent water and abrasion resistant film serving to protect the bottle during cleaning, filling and shipping and serving to minimize fragmentation in case of breakage.

The dispersion, when added to a resin-based floor polish formulation, can provide a durable polished non-skid abrasion resistant finish.

EXAMPLE VI

An aqueous polymer dispersion is prepared in accordance with the procedure of Example II by making an icocyanate-terminated prepolymer, which is subsequently dispersed in water, by using:

| | |
|---|---|
| polyoxypropylene diol ($\overline{M}_n$ = 1250) | 623 |
| 80:70 2,4:2,6-tolylene diisocyanate | 174 |
| 2-butanone | 80 |
| $H_2N(CH_2)_3Si(OC_2H_5)_3$ | 16 |
| $CH_3C(CH_2OH)_2CO_2H\cdot N(C_2H_5)_3$ | 40 |
| Water | 1600 |

The resulting dipsersion contains linear polymer in anionic dispersion having on the average 2800 daltons per carboxyl group and 11,000 daltons per pair of terminal silyl groups. The dispersion is particularly useful for impregnation of porous substrates, such as paper, nonwoven fabric, glass fiber fabric, leather, wood, and ceramic or lithic articles. Fibrous articles become water resistant tough products with, for example, reduced tendency to unravel and resist undue nap formation while retaining a soft hand. Treated substrates can be colored, dyed, printed and embossed. For application of the dispersions of the invention to substrates it is generally desirable to formulate coating compositions from dispersions of the invention in order to take into account the characteristics of the substrate. Such formulations are also conventional with heretofore known polymer dispersions.

The isocyanate-terminated prepolymer above has a low viscosity prior to chain extension by water, and hence gives an excellent dispersion with small particles which is especially suitable for impregnation of leather. The dispersion, L, is mixed with 10% of its total weight of butoxy-ethoxyethanol and 4% of sodium dodecyl-succinate (to improve penetration), diluted with water to 10% polymer solids, and applied to top-grain cowhide at a weight of about 0.003 g/cm² of polymer solids. The finished leather shows excellent resistance to cracking on repeated flexing at room temperature or below, and exceptional abrasion resistance as compared to a commercial coating. For comparison, another piece of leather is similarly treated with a poly(ethylacrylate coacrylic acid) latex, (Primal 510, Rohm and Haas Company) diluted to 10% polymer solids. Each sample, with one of untreated leather, was subjected to 1000 cycles on a Taber Abraser using CS-17 Calibrase abrasive wheel at 1000 gram load.

| | Original Weight Grams | Weight Loss Grams |
|---|---|---|
| Control | 8.13 | 0.19 |
| Commercial Latex | 10.9 | 0.12 |
| Dispersion L | 11.9 | 0.06 |

A three part leather-treating system is formulated:

| | |
|---|---|
| Part (1) - Impregnation Coat | |
| Dispersion L (30% solids) | 50 |
| Sodium Dodecyl Succinate Soln (1% solids) | 150 |
| Butoxyethoxyethanol | 5 |
| Part (2) - Color Coat (Black) | |
| Dispersion A (30% solids) | 100.0 |
| Aqueous Carbon Dispersion (12% solids) | 62.5 |
| *Poly(ethylacrylatecoacrylic acid) Dispersion (30% solids) | 0.5 |
| Butoxyethoxyethanol | 1.5 |
| Water | 100.0 |
| Part (3) - Top Coat | |
| Dispersion L (30% solids) | 50 |
| Butoxyethoxyethanol | 0.5 |
| Water | 100.0 |

*"Acrysol 60", Rohm and Haas Company

A piece of chrome-tanned top-grain cowhide suitable for shoe-upper leather is impregnated with Part (1) at a pick-up to provide about 0.003 g/cm² polymer solids and dried at 70° C. This is then sprayed twice with Part (2), about 0.002 g/cm²/coat, drying after each coat. Finally it is embossed with a pattern at 95° C., 2100 kg/cm² for 10 seconds, sprayed with one coat of Part (3) at about 0.002 g/cm², dried at 70° C. for 10 minutes and cured at 95° C. for one minute. As a control, a piece of commercially finished leather, with an acrylic impregnation coat, an acrylic color coat, and a nitrocellulose top coat is selected. The pieces are cycled on a Bally Flex tester, then a piece of pressure sensitive adhesive-coated tape is applied onto the surface and removed. The leather finished according to the invention with the silyl-terminated urethane shows loss of less than 1% of the coating to the adhesive after 100,000 cycles. The commercial sample shows a loss of about 50% of the finish after only 10,000 cycles.

EXAMPLE VII

An aqueous polymer dispersion is prepared from:

| | |
|---|---|
| polyester diol | 822 |
| 80:20 tolylene diisocyanate | 348 |
| 2-butanone | 117 |
| Water | 2300 |

The polyester diol (available as polycaprolactone D-520 with number average molecular weight of 820 from Union Carbide Chemicals) is melted and charged to a glass flask fitted with stirrer, reflux condenser, and means for heating and cooling. Pressure is reduced to about 5 torr at 130°–140° C. and maintained for about 30 minutes to strip adventitious moisture from the polyester diol. The liquid is then cooled to 55° C. and the diisocyanate slowly charged; cooling is applied periodically to maintain the temperature at about 75° C. while the diisocyanate is being added. The temperature is maintained at 75° C. for two hours, with stirring. Stannous octoate (0.3 g. 25% solution in dioctyl phthalate) is added and stirring continued at 75° C. for 3 hours. Methyl ethyl ketone is added to reduce viscosity. There is obtained a 91% isocyanate terminated prepolymer solution. This solution is further processed in accordance with Example II as indicated in the table in which amounts are parts by weight.

| | M | N | O | P |
|---|---|---|---|---|
| prepolymer | 200 | 200 | 200 | 200 |
| $H_2N(CH_2)_3Si(OC_2H_5)_3$ | 4 | — | 4 | 4 |
| $CH_3C(CH_2OH)_2CO_2H\cdot N(C_2H_5)_3$ | 17 | 17 | 51 | 3.7 |
| 2-butanone | 5 | 5 | 15 | 1 |
| water | 400 | 400 | 800 | 400 |
| daltons/ionic group | 2770 | 2770 | 920 | 13800 |
| daltons/2 silyl groups | 22000 | — | 22000 | 22000 |
| dispersion quality | good | good | clear | good high coagulation |

Films cast on glass from dispersions M and N and cured are hard, tough, and tack-free. The film from M has excellent water resistance. Characteristics of films from M and N are tabulated below:

|  | M | N |
| --- | --- | --- |
| Tensile, kg/cm$^2$ | 424 | 319 |
| 100% Modulus, kg/cm$^2$ | 58 | 25 |
| Tear Strength, kg/cm | 36 | 34 |
| Elongation at break, % | 590 | 590 |

The silane-free polymer, N, gives a film which disrupts after 20 minutes exposure to water. The film from P is relatively brittle and hazy with poor water resistance, suggesting a large particle size for the dispersion. Dispersion O, with the highest water-solubilizing group content, is almost transparent. Electrodeposition of the dispersion of O on iron or stainless steel anode strips results in a clear colorless hard abrasion-resistant protective film when cured for 5 minutes at 200° C. In contrast, a film of the same dispersion cast on glass is soft and requires extensive drying to reduce tackiness.

What is claimed is:

1. An aqueous dispersion of poly(urethane-urea) characterized in having a poly(urethane-urea) backbone containing interspersed bound water-solubilizing ionic groups pendant from said backbone and terminal mutually interractive silyl groups.

2. An aqueous dispersion of curable poly(urethane-urea) characterized in having a poly(urethane-urea) backbone containing interspersed bound solubilizing ionic moieties pendant from said backbone and terminal mutually interreactive silyl moieties, said solubilizing moieties being present to an extent of about one per 800 to 20,000 daltons and the silyl group of said silyl moieties being of the general form $Y_3Si-$ where Y is a labile group and said silyl moieties further being present to an extent of about two per 1000 to 125,000 daltons and there being no more than one prepolymer-derived cross-link per 3000 daltons in said curable poly(urethane-urea).

3. An aqueous dispersion of curable poly(urethane-urea) according to claim 2 wherein the silyl group is $(QO)_3Si-$ wherein Q is H or alkyl of 1 to 4 carbon atoms.

4. Process for production of an aqueous dispersion of poly(urethane-urea) comprising the steps of
    1. reacting polymeric polyol with a stoichiometric excess of polyisocyanate to produce isocyanate-terminated prepolymer,
    2. reacting said prepolymer with less than stoichiometric amounts of isocyanate-reactive $X_3Si-$ compound and water solubilizing ionic compound, X being H, alkoxy, acyloxy, halogen or amino, to obtain an isocyanate containing prepolymer and thereafter,
    3. mixing said isocyanate-containing prepolymer with water under agitation thereby obtaining a stable dispersion of silyl-terminated poly(urethane-urea).

5. An at least partially siloxane cross-linked self-supporting film of poly(urethane-urea) comprising interspersed bound water solubilizing ionic groups pendent from the backbone of said poly(urethane-urea).

* * * * *

UNITED STATES PATENT AND TRADEMARK OFFICE
CERTIFICATE OF CORRECTION

PATENT NO. : 3,941,733
DATED : March 2, 1976
INVENTOR(S) : Joe H-S Chang

It is certified that error appears in the above-identified patent and that said Letters Patent are hereby corrected as shown below:

Column 3, line 40, "resluting" should read -- resulting -- .

Column 7, line 22, "$(HOC_2F_5)...$" should read -- $(HOC_2H_5)...$ -- .

Column 8, line 14, "$...[NH(C_2H_5)_3{}^+$" should read -- $...[NH(C_2H_5)_3]^+$ -- .

Column 9, line 52, "F" should read -- E -- .

Column 15, line 29, "interractive" should read -- interreactive -- .

Signed and Sealed this

Twelfth Day of October 1976

[SEAL]

Attest:

RUTH C. MASON
*Attesting Officer*

C. MARSHALL DANN
*Commissioner of Patents and Trademarks*